United States Patent
Eskin

(10) Patent No.: US 9,025,959 B2
(45) Date of Patent: *May 5, 2015

(54) UNIVERSAL SYSTEMS AND METHODS FOR DETERMINING AN INCOMING CARRIER FREQUENCY AND DECODING AN INCOMING SIGNAL

(75) Inventor: Michael A. Eskin, El Cajon, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 298 days.

This patent is subject to a terminal disclaimer.

(21) Appl. No.: 13/540,466

(22) Filed: Jul. 2, 2012

(65) Prior Publication Data

US 2013/0039449 A1  Feb. 14, 2013

Related U.S. Application Data

(63) Continuation of application No. 12/358,971, filed on Jan. 23, 2009, now Pat. No. 8,213,809.

(51) Int. Cl.
| | |
|---|---|
| *H04B 10/114* | (2013.01) |
| *H04L 27/06* | (2006.01) |
| *H04L 27/00* | (2006.01) |
| *H04L 27/227* | (2006.01) |
| *H04L 27/38* | (2006.01) |

(52) U.S. Cl.
CPC ......... *H04L 27/066* (2013.01); *H04L 27/0014* (2013.01); *H04L 27/2271* (2013.01); *H04L 27/3827* (2013.01)

(58) Field of Classification Search
USPC ....................................................... 398/106
See application file for complete search history.

(56) References Cited

U.S. PATENT DOCUMENTS

| | | | | |
|---|---|---|---|---|
| 5,684,830 | A  * | 11/1997 | Ichikawa et al. | 375/254 |
| 6,097,520 | A    | 8/2000  | Kadnier | |
| 7,135,985 | B2   | 11/2006 | Woolgar et al. | |
| 7,676,003 | B2   | 3/2010  | Flachs et al. | |
| 8,213,809 | B2 * | 7/2012  | Eskin | 398/202 |
| 2003/0095212 | A1 * | 5/2003 | Ishihara | 348/734 |
| 2004/0054747 | A1   | 3/2004 | Breh et al. | |
| 2010/0074631 | A1 * | 3/2010 | Mahowald | 398/202 |

OTHER PUBLICATIONS

ST Microelectronics, Implementing an RC5 infrared transmitter using the IR timer modulator of the STM8L 10x microcontroller, Jun. 2010.
Philips Semiconductor, SAA3008 Datasheet, Dec. 1988.
Celadon, Inc., Sample Infrared Code Formats, Mar. 16, 2003.
http://193.23.168.87/Mikrocontroller/Kohlert/rc5_codes.html, Jun. 29, 2005.

(Continued)

*Primary Examiner* — Shi K Li
(74) *Attorney, Agent, or Firm* — Haynes and Boone, LLP

(57) ABSTRACT

Consumer infrared (CIR) systems typically are used in remote control systems. Most CIR systems expect a known carrier frequency and encoding scheme. However, there are many applications of a universal CIR receiver which can receive and decode CIR signals regardless of the carrier frequency or encoding scheme. A CIR receiver circuit is disclosed which can both decompose a received CIR signal into run length representation and detect the carrier frequency. The result can then be supplied to a host device for further processing, interpretation and/or actions.

20 Claims, 6 Drawing Sheets

(56) References Cited

OTHER PUBLICATIONS

Philips RC-5 Protocol, http://www.xs4all.nl/~sbp/knowledge/ir/rc5.htm, Jul. 1, 2005.

Vishay Semiconductors, IR Receiver Modules for Remote Control Systems, TSOP11 datasheet, Jan. 27, 2005.

* cited by examiner

UNIVERSAL SYSTEMS AND METHODS FOR DETERMINING AN INCOMING CARRIER FREQUENCY AND DECODING AN INCOMING SIGNAL

CROSS-REFERENCE TO RELATED APPLICATION

The present application is a continuation of U.S. Pat. No. 8,213,809, issued Jul. 3, 2012, entitled, "UNIVERSAL SYSTEMS AND METHODS FOR DETERMINING AN INCOMING CARRIER FREQUENCY AND DEMODULATING AN INCOMING SIGNAL" which is hereby incorporated by reference for all purposes.

BACKGROUND OF THE INVENTION

1. Field of the Inventions

The invention relates generally to demodulating a signal and determining its carrier frequency and particularly to using the same circuit to perform both tasks.

2. Background Information

In a typical consumer infrared (CIR) system, a digital signal is used to communicate between devices such as between an electronic product and a remote control (RC). This digital signal is usually of low rate such as 1 or 2 bits per millisecond. A high data rate is not required in these applications since the amount of information conveyed by a command is usually very small.

The actually encoding scheme can vary depending on the system. FIG. 1A illustrates a signal where a fixed symbol period is used. During each period, information can be expressed. This example is a portion of a message encoded with the Philips RC-5 protocol. Each symbol comprises two half period where the signal is high during one of the two half periods and whether the bit conveyed is a "1" or "0" depends on which half is high.

FIG. 1B illustrates a signal where a variable symbol period is used. The example is a portion of a message encoded with the Philips RC-6 protocol. As can be seen, the first symbol which is primarily used for timing is long, followed by several short symbols and an intermediate length symbol. While the specifics of each encoding scheme are not important to the understanding of this disclosure, it should be noted that in general signals from RCs are sequences of high and low signal with either fixed or variable symbol periods.

Due to the low data rate, ambient light sources could potentially interfere with the CIR signal. For example fluorescent lights flicker at 60 Hz and may produce light in the infrared region used by the CIR device. Additionally, the photodetectors used in the CIR receivers may not be tuned specifically to a narrow infrared frequency, inviting optical interference from a variety of sources. For this reason, CIR signals are used to modulate a carrier signal. Typically, the use of a carrier signal enables the receiver to filter out noise for example through the use of a notch filter.

FIG. 2 conceptually shows the modulated signal. As this is an example, it should not be taken that the actual number of pulses shown is a true relationship between the unmodulated signal and the modulated signal. FIG. 2 is a magnified view of the portion of the signal highlighted in FIG. 1B. Depending on the manufacturer carrier frequency can vary between 30 kHz and 65 kHz.

FIG. 3 illustrates an exemplary receiver circuit for a CIR receiver. An IR is received by photodetector 302 which can be implemented using a photodiode or other methods that are well known in the art. The signal is then amplified by amplifier 304 which is often a transimpedance amplifier. Not only does the amplifier boost the signal received by photodetector 302, but it is often used to convert the current to a voltage. Typical photodetectors produce a current proportional to the optical power seen, but most logic circuits use voltage to transmit signals. The amplified signal is then limited by limiter 306, which is often a limiting or saturating amplifier. The limiter 306 helps to insure a full logic level is obtained. The signal is then filtered using filter 306 which can be a band pass filter allowing essentially the carrier signal or range of potential carrier signals through. The signal is then demodulated by demodulator 310 and decoded by decoder 312. Decoder 312 can pass on the message or command received to an appropriate circuit for use. Often the decoder comprises an integrator and a comparator to extract the information.

In a typical receiver, the carrier frequency and the encoding methods are known. As a result, filter 306 and demodulator 310 can be tuned specifically to the carrier frequency and decoder 312 can extract the command or message sent by the RC. However, for a universal receiver, the carrier frequency and encoding methods are not precisely known. The receiver may know for instance that the carrier is one of many, but not which of the many. For a universal CIR receiver, there can also be a requirement that the carrier frequency be provided along with the command or message. To complicate the situation further, the determination of the carrier frequency can be required to be obtained simultaneously with the decoding of the command or message, that is, no time is allotted to carrier frequency determination. Accordingly, various needs exist in the industry to address the aforementioned deficiencies and inadequacies.

SUMMARY OF INVENTION

A system and method for concurrently detecting a carrier frequency and decoding an incoming signal using the same circuitry comprises a switching element for selecting between a demodulated and modulated signal. The system further comprises an edge detector, adjustable clock, and counter for counting the number of clock cycles between edge detections. When the clock is adjusted to a high enough frequency for sampling the carrier, the frequency can be determined from the numbers of clock cycles found between edge detections. The frequency can further be refined by comparing the frequency to commonly used carrier frequencies. When the clock is adjust to a lower sampling rate and the demodulated signal is selected, the same circuitry can decode the incoming signal. Furthermore, the duration of the first pulse in the incoming signal can be refined by adding a total elapsed time while detecting the carrier frequency and transitioning to decoding can be added to the first decoded value.

In addition to determining the carrier frequency, the duty cycle of the carrier can also be determined. The circuitry can also tune the demodulator and band-pass filter upon determining the carrier frequency.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

A detailed description of embodiments of the present invention is presented below. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

While typical receiver CIR receiver circuits have knowledge of the incoming carrier frequency and incoming protocol, a universal CIR receiver is designed to process any CIR signal regardless of the carrier frequency or protocol. A universal CIR receiver circuit can be used to decode an arbitrary CIR signal or to provide data to allow the regeneration of a CIR signal. For example, a universal CIR receiver circuit can be included in a PC hardware which is trained to control a remote device. The PC hardware learns the CIR protocol with data provided by a universal CIR receiver and later can used the patterns learned to control another device.

Figure 1A:
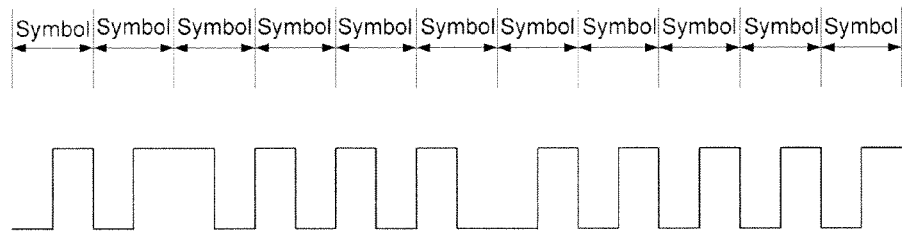
FIG. 1A illustrates a signal where a fixed symbol period is used.
Figure 1B:
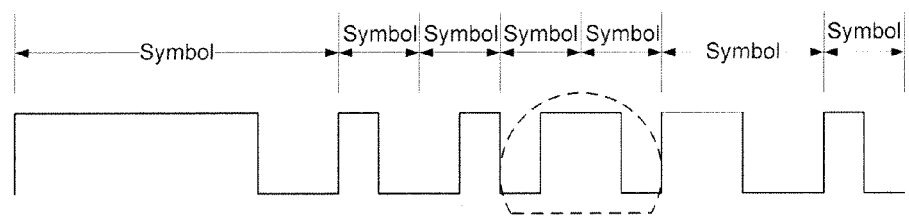
FIG. 1B illustrates a signal where a variable symbol period is used.
Figure 2:
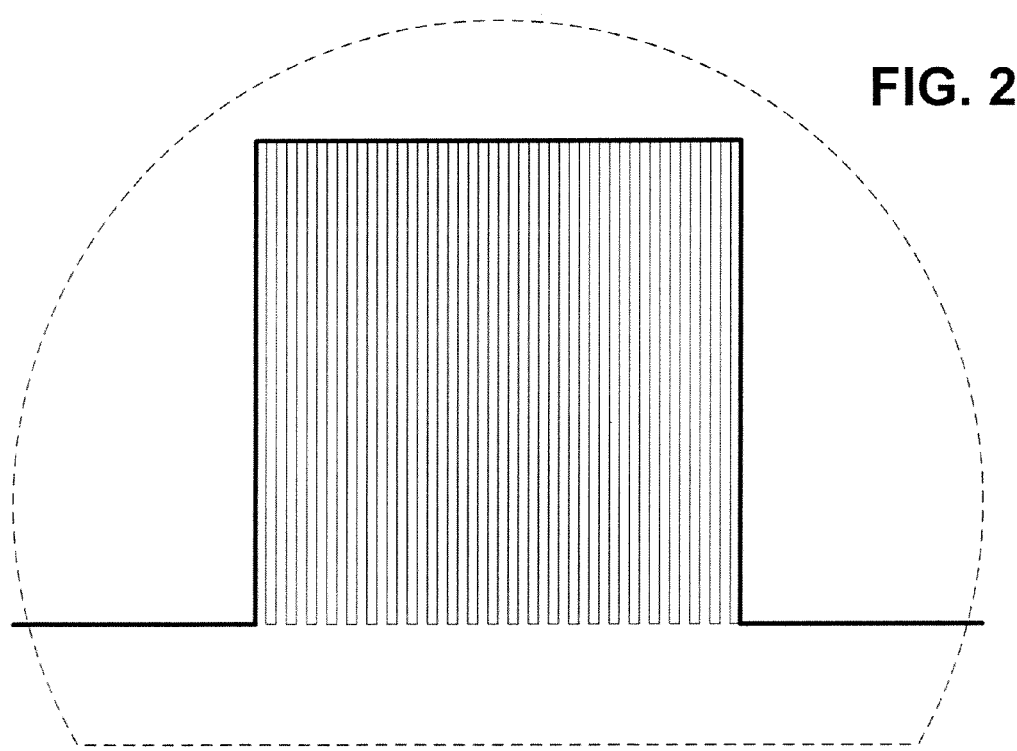
FIG. 2 is a magnified view of the portion of the signal highlighted in FIG. 1B.
Figure 3:
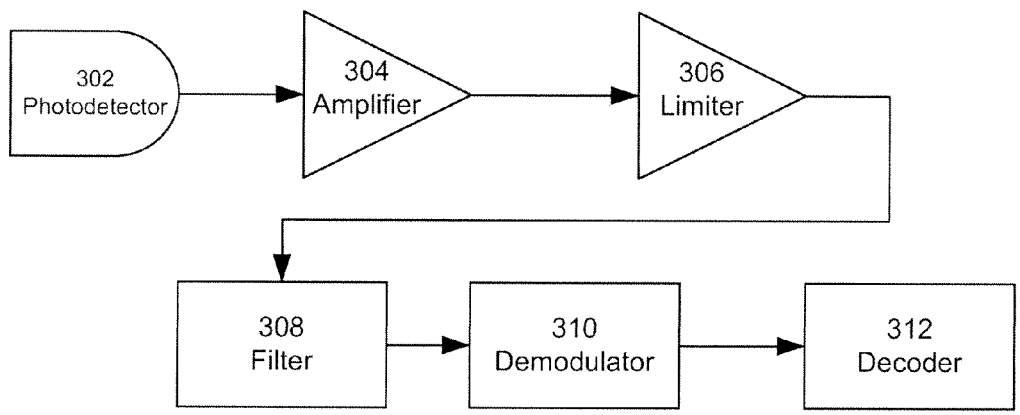
FIG. 3 illustrates an exemplary receiver circuit for a CIR receiver.
Figure 4:
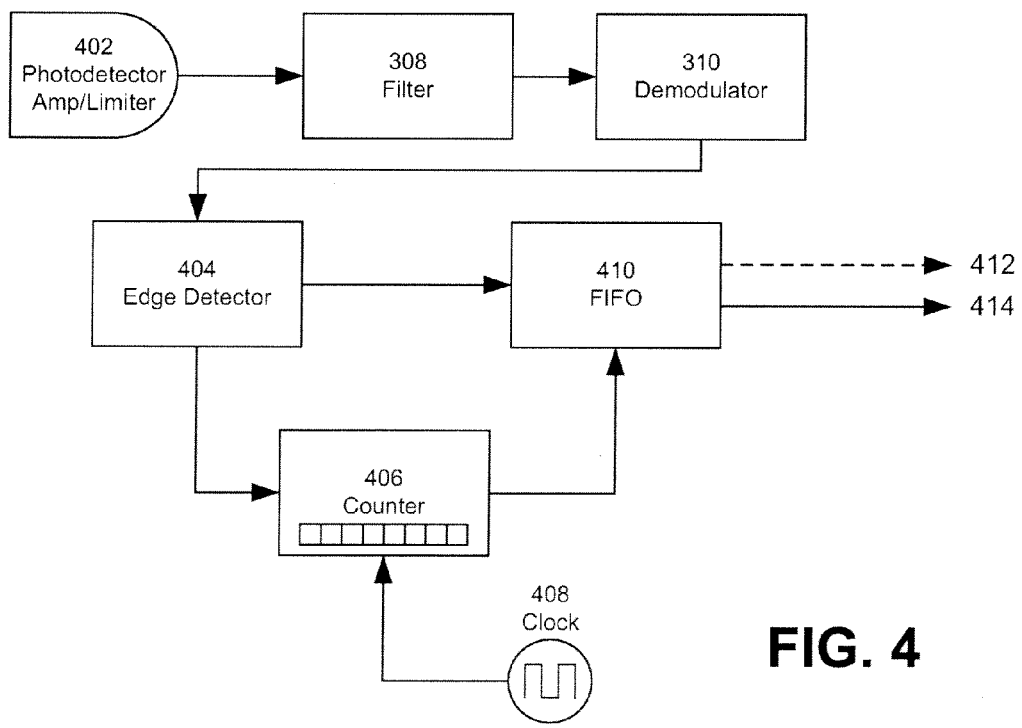
FIG. 4 illustrates an exemplary embodiment of a universal CIR receiver.

FIG. 4 illustrates an exemplary embodiment of a universal CIR receiver. For clarity, photodetector 302, amplifier 304, and limiter 306 have been condensed into a single block, detection block 402. These components as well as filter 308 and demodulator 310 essentially function in a similar fashion as described for FIG. 3. The decoder comprises edge detector 404, first-in-first-out (FIFO) memory 410, counter 406 and sampling clock 408. The demodulated signal produced by demodulator 310 is provided to edge detector 404. Whenever edge detector 404 encounters an edge in the signal, that is a transition from high to low or from low to high, it causes the transfer of the count in counter 406 to FIFO memory 410. In addition to the count, the polarity of the transition (high to low or low to high) is also stored in the same memory unit within FIFO memory 410. Edge detector 404 also resets counter 406. In an alternative embodiment, FIFO memory 410 or its supporting circuitry can also sets interrupt 412 so that additional logic or a processor is notified that a new entry was added to FIFO memory 410 and could be read from output 414. Alternatively, interrupt 412 can be set when the FIFO memory is full or half-full. Edge detector 404 can also comprise some de-glitching functionality to insure that only true polarity transitions are detected.

Sampling clock 408 provides the basic unit of time for which the duration of each state is measured. For example, if the signal stays high for 2 ms and sampling clock 408 is set to 4 kHz, then counter 406 would register 8 clock cycles for a high signal. This representation is essentially a run length encoding (RLE) of the state of the input signal. With a properly set sampling clock, such an output would be sufficient to properly characterize the input signal regardless of whether fixed or variable length symbol periods are used. Hence this can be applied to a universal CIR receiver where the precise format of the input signal is not known at the time it is first received.

Figure 5:
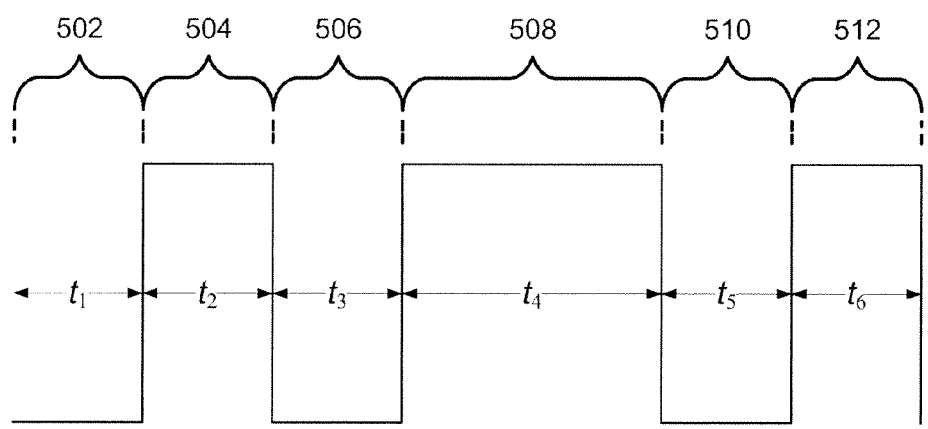
FIG. 5 illustrates the relationship between a demodulated signal and its representation in FIFO memory.
Figure 5:
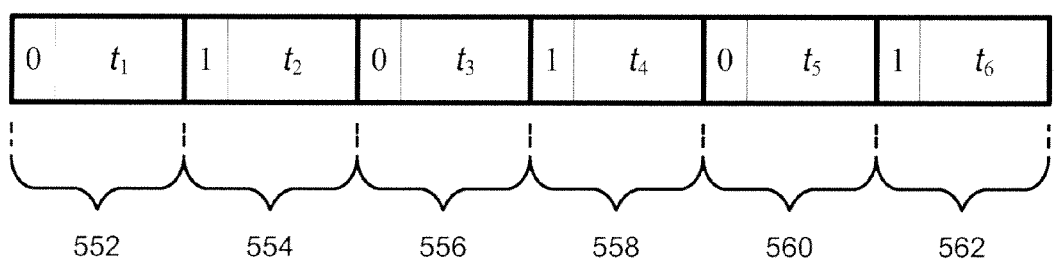

FIG. 5 illustrates the relationship between a demodulated signal and its representation in FIFO memory 410. During interval 502, the signal is low for a period of $t_1$. The corresponding entry in FIFO memory 410, entry 552 is a zero representing the low signal along with $t_1$. When this is read, any interpreting logic can take this entry to mean the signal is zero for $t_1$ clock cycles. Similarly, during interval 504, the signal is high for a period of $t_2$. Corresponding entry 554 is a one representing a high signal along with $t_2$ the duration. In the remainder of the example, interval 506 is mapped to entry 556; interval 508 is mapped to entry 558; interval 510 is mapped to entry 560; and interval 512 is mapped to entry 562. It should be noted that in the case of a fixed symbol period protocol, a single entry in FIFO memory 410 could provide information about two symbol periods. In particular interval 508 spans the second half of one symbol period and the first half of the subsequent symbol period.

The RLE representation of the input signal provides sufficient information for any interpreting logic to match the signal to a database and determine which protocol is being used. To give a receiver time to detect that a signal is present, set the gain, etc., most standards start the protocol with one or more preamble pulses before sending actual data. The preamble can also be used to aid in determining the protocol being used. In addition, if the protocol does not match a known protocol, the pattern supplied by the RLE representation can be used to "learn" the unknown protocol when the system is in a learning mode.

The receiver in FIG. 4 provides a universal system and method for receiving and decoding an unknown IR signal. However, it does not provide any means for detecting the carrier frequency. As mentioned above, the ability to detect the carrier frequency can make the filtering and demodulation more effective and precise, can help identify the protocol being used and may be a requirement imposed on the CIR receiver. Furthermore, the carrier frequency is also used by a regeneration circuit in order to recognize the frequency a regenerated CIR signal should be transmitted at.

One approach used in the past is to employ a separate carrier detection circuit. The disadvantage is that a separate circuit increases the circuitry required, may increase power consumption for a function which is not required all the time. In addition, the demodulator and filter may not be set properly during the transition period when the carrier frequency is being determined.

Figure 6:
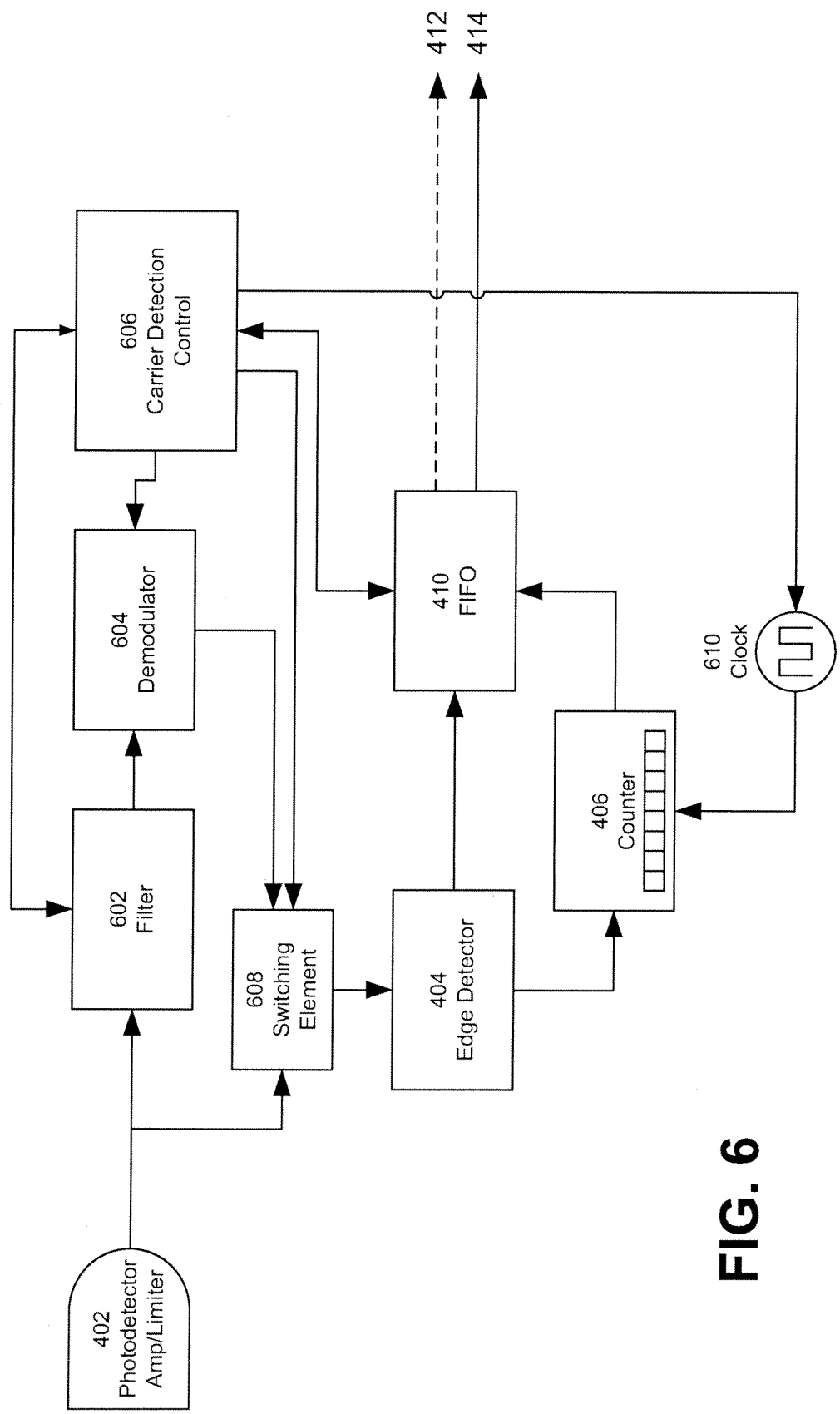
FIG. 6 is an embodiment of a portion of a CIR receiver with carrier frequency detection capability.

FIG. 6 is an embodiment of a portion of a CIR receiver with carrier frequency detection capability. Filter 602 is essentially similar to filter 308 except that in some variations filter 602 can be tuned to a more specific carrier frequency by carrier detection control 606. Carrier detection control 606 can be a separate logic circuit or can comprise a processor executing software specific to perform the functions as described below. Similarly, demodulator 604 is essential similar to demodulator 310 except that in some variations of a CIR receiver, the demodulator can be tuned to a specific carrier frequency by carrier detection control 606. Also sampling clock 610 can be adjusted by carrier detection control 606. The actual implementation of sampling clock 610 can be implemented by using a frequency divider, which is widely known to those of ordinary skill in the art, employed with a high frequency master clock. The adjustment to clock 610 is accomplished by adjusting the frequency divider. For example, a 100 MHz clock could be used and a frequency divider could be set to produce a sampling clock of 1 MHz or 100 kHz depending on the desired setting.

In initial operation CIR 600 is in carrier frequency detection mode. In this mode switching element 608 diverts the processed input by detection block 402 directly to the edge detector 404. Switching element 608 can be an electronically controlled switch or any number of switching circuits known to those of ordinary skill in the art. Furthermore, if desired demodulator 604 and filter 602 can even be deactivated. Additionally, sampling clock 610 is set fast enough to adequately sample the carrier frequency. The minimum frequency for sampling clock 610 is the Nyquist rate of the maximum expected frequency. However, the accuracy of the sampling is dependent on the resolution of the clock, no a faster sampling clock yields more accurate results. For example, if the range of carrier frequency reaches 65 kHz a sampling clock of many times 65 kHz would suffice. However, as a limiting factor, the sampling frequency should not be se so high as to overflow the entry in FIFO memory 410 that will be used to store the results of the sampling. The relation between edge detector 404, counter 406 and FIFO memory 410 is essentially the same as described for FIG. 4. However, in carrier frequency detection mode, the entries in the FIFO memory measure the high and low duration in the carrier signal. This result is from FIFO memory 410 by carrier detection control 606. Carrier detection control 606 can optionally be signaled with an interrupt when a new entry in the FIFO memory is created upon an edge transition.

Carrier detection control 606 can take the time interval between rising (or equivalently falling) edges, i.e., one period, in the carrier signal to determine the carrier frequency. If the carrier is known to have a 50/50 duty cycle, only the time interval between a rising and falling edge (or equivalently a falling and rising edge), i.e., a half period, is necessary to compute the carrier frequency. If carrier detection control 606 has access to a database of known frequencies, it can further refine the detected frequency by comparing the measured frequency to the known frequencies and selecting the closest fit. Any frequency detected that is not close to a known frequency can be recorded as potentially an unknown 1R protocol is used. Carrier detection control 606 can sample several periods before making a definitive decision on the carrier frequencies. This would allow it to compensate for errors or aberrations in the signal. In short, the process can be repeated until a sufficiency condition is met. This condition can be simply waiting until a predetermined number of periods have been observed. In another example, an estimate of the carrier frequency can be made each time a period is observed and refined when a subsequent period is observed. When the estimates show little change the sufficiency condition is met.

Once the carrier frequency is determined, CIR 600 goes into decoding mode. Carrier detection control 606 can optionally provide the carrier frequency to filter 602 and demodulator 604. In addition, carrier detection control 606 switches switching element 608 so that the demodulated output 604 is now diverted to edge detector 404. Sampling clock 610 is also adjusted by carrier detection control down to a sampling rate more suited for measuring demodulated signals. FIFO memory 410 can also be completely reset. At this point, the operation of CIR 600 is essentially the same as CIR 400, with one exception. On the first high signal, the time used to process the carrier detection should be added to the first FIFO memory entry in order to accurately reflect the amount of time the input signal was in the high state.

Figure 7:
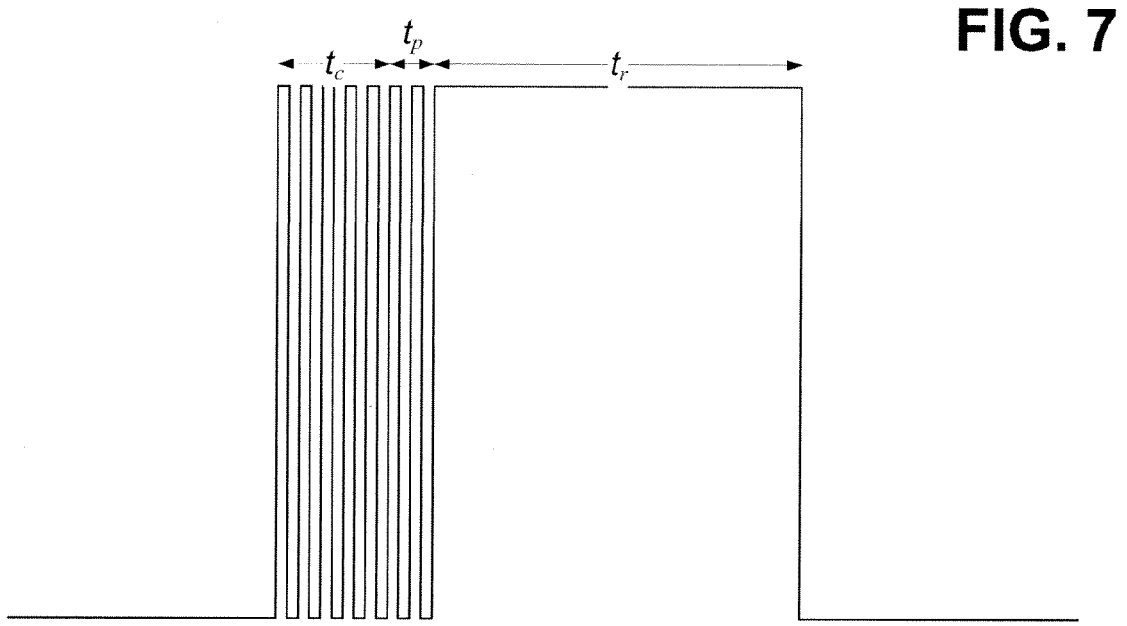
FIG. 7 illustrates an example of the timing of the first pulse received.

FIG. 7 illustrates an example of the timing of the first pulse received. During the initial reception of the pulse, CIR 600 is in carrier frequency detection mode and observes several periods of the carrier signal, for a total of $t_c$ fast clock cycles, that is the sampling clock cycle when in carrier frequency detection mode. It may take an additional $t_p$ fast clock cycles to perform the processing to determine the carrier frequency and to switch CIR 600 into decoding mode. This processing time can include the calculation time of carrier detection control 606 and the amount of time to detect a change in FIFO memory 410 which may be interrupt latency or a polling period depending on the implementation. The determination of the interrupt latency can be measured by examining bus traces. A high resolution clock can be used to measure calculation time employed in carrier detection. Once in decoding mode, CIR 600 measures an additional $t_r$ slow clock cycles, that is the sampling clock cycle when in decoding mode, until the input signal transitions from high to low. The times intervals $t_c$ and $t_p$ should be accounted for. Two methods are to reset the counter to an initial value of $t_c+t_p$ expressed in slow clock cycles, upon the transition from carrier frequency detection mode to decoding mode or to add $t_c+t_p$ expressed in slow clock cycles when $t_r$ is stored into a FIFO memory entry. Expressing $t_c$ and $t_p$ in terms of slow clock cycles is a simple arithmetic operation which divides $t_c$ and $t_p$ by the number of fast clock cycles per slow clock cycle. For example if the sampling clock rate is 10 times in carrier frequency detection mode than in decoding mode, $t_c$ and $t_p$ should be divided by 10. In this way, an accurate count of the first pulse can be made.

The sampling rate of clock 610 should be set sufficiently high to get an accurate reading of the carrier frequency and the shape of the demodulated signal in the carrier frequency detection mode and the decoding mode, respectively. The frequency especially in decoding mode should not be set so high as to overflow entries in the FIFO memory. In the event a large amount of memory is dedicated to the FIFO memory, the same sampling frequency could be used in the carrier frequency detection mode and the decoding mode.

Figure 8:
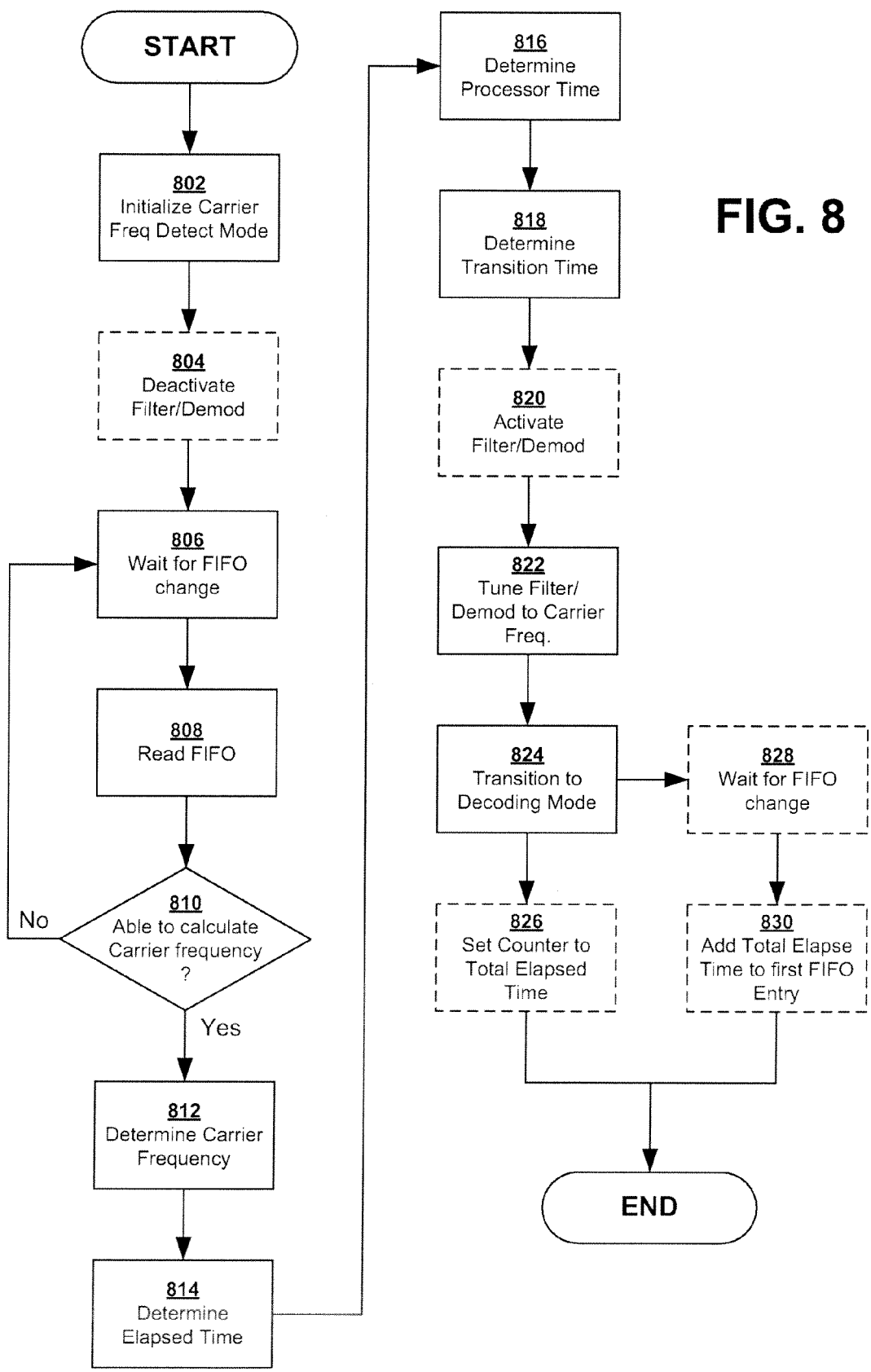
FIG. 8 is a flow chart illustrating the operation of the carrier detection control.

FIG. 8 is a flow chart illustrating the operation of the carrier detection control. At step 802, carrier detection control 606 initializes the CIR circuit for carrier frequency detection mode. This can include setting switching element 608 so that edge detector 404 receives input directly from detection block 402. In addition, counter 406 is reset, FIFO memory 410 is cleared, and clock 610 is set to a carrier detection sampling rate. Optionally, at step 804, demodulator 604 and filter 602 can be deactivated. At step 806 carrier detection control 606 waits for a change in FIFO memory 410. This could be a wait for an interrupt and could occur when a new entry is added to FIFO memory 410 or when it is half-full or when it is full depending on the implementation. At step 808, the data pattern is read from FIFO memory 410. At step 810, carrier detection control 606 determines whether sufficient information has been read to calculate the carrier frequency. If not, carrier detection control 606 returns to step 806 to await more data. When enough data is gathered, carrier detection control 606 calculates the carrier frequency at step 812. It can select the carrier frequency from the best matching known frequency or it can choose to use a calculated value. At step 814, the elapsed time from the first edge detection is tabulated. At step 816, the time it takes to process the carrier frequency calculation is determined. At step 818, the time it take to transition to decoding mode is determined. If at step 804, filter 602 and demodulator 604 were deactivated. They are reactivated at step 820. Both steps 804 and 820 are optional, but are either both included or both excluded.

At step 822, filter 602 and demodulator 604 can be tuned to the carrier frequency. Depending on the nature of filter 602 and demodulator 604, neither, either or both can benefit from the knowledge of the carrier frequency. At step 824, carrier detection control 606 transitions to decoding mode which can include setting switching element 608 so that edge detector 404 receives its input from demodulator 604. Sampling clock 610 is set to a lower frequency for a decoding sampling rate. FIFO memory 410 can be cleared and counter 406 can be reset. After step 824, the total elapsed time, that is the elapsed time for measuring the carrier, the processing time, and the transition time are added to the first interval determined in decoding mode. Two possible methods are shown. At step 826, counter 406 is set to the total elapsed time while in the carrier frequency detection mode as measured in decoding sampling periods. Alternatively, carrier detection control 606 waits for notification that FIFO memory 410 has new entries at step 828. At step 830, the total elapsed time while in the carrier frequency detection mode as measured in sampling periods is added to the first entry in FIFO memory 410. In this alternative, the interrupt signal may need to be intercepted by carrier detection control 606 and reissued to avoid output 414 being read before the total elapsed time can be added to the first entry in FIFO memory 410.

Although not typically specified in any standard, the duty cycle of the carrier signal can also be determined at the same time as the carrier frequency detection. Typically, no specific duty cycle is given for the operation of a remote device; however, in regenerating a CIR signal, it may be desirable to not only replicate the carrier frequency, but the duty cycle as well, in order to address potential quirks in a proprietary transmitter/receiver system.

It should be noted that the approach would work in even a deeper nesting of modulations. Suppose that because of transmission on yet another medium the composite signal is modulated on yet another carrier of even higher frequency. The receiver circuit could first focus on detecting the frequency of the highest speed carrier. Then when that carrier is determined, it can be demodulated and the frequency of the lower speed carrier can be then be determined. Finally, after the lower speed carrier is demodulated, the data signal can be characterized.

In addition this circuit and method could also be used for non square wave carrier, such as a sinusoid or any other type of periodic signal. All that is required is that the edge detector consistently detects either a high to low transition or a low to high. The time between consecutive high to low transitions or between consecutive low to high transitions is the period of the carrier signal.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed:

1. A receiver comprising:
a memory coupled to an edge detector and a counter, the edge detector configured to transfer a value from the counter to the memory whenever the edge detector detects an edge in an incoming signal;
a controller configured to cause a switching element to select a modulated signal when the receiver is in a carrier frequency detection mode, the controller further configured to set an adjustable clock to a sampling rate for sampling a carrier signal, the controller further configured to determine a carrier frequency of the modulated signal after a predetermined condition is met while in the carrier frequency detection mode, the controller further configured to cause the switching element to select a demodulated signal and set the adjustable clock to a sampling rate for sampling the demodulated signal when the receiver is in a decoding mode and the controller further configured to add a total elapsed time to a first entry in the memory during a transition between carrier frequency detection mode and decoding mode.

2. The receiver of claim 1 wherein the controller is further configured to set the counter to the total elapsed time when transitioning from carrier frequency detection mode and decoding mode.

3. The receiver of claim 1 wherein the controller is further configured to determine the total elapsed time by adding a time elapsed during edge detections in the carrier frequency detection mode, a time spent determining the carrier frequency, and a time spent transitioning from carrier detection mode and decoding mode.

4. The receiver of claim 1 wherein the controller is further configured to determine a duty cycle of the carrier frequency.

5. The receiver of claim 1 wherein the memory is a first-in first-out (FIFO) memory.

6. The receiver of claim 1 further comprising a band-pass filter and a demodulator for demodulating the modulated signal into the demodulated signal.

7. The receiver of claim 6 wherein the controller is further configured to deactivate the demodulator and/or the band-pass filter when in the carrier frequency detection mode and to activate the demodulator and/or the band-pass filter when in the decoding mode.

8. The receiver of claim 6 wherein the controller is further configured to tune the band-pass filter and/or the demodulator after determining the carrier frequency.

9. The receiver of claim 1 wherein the controller is further configured to determine a carrier frequency by retrieving values in the memory, to calculate a frequency based on the values in memory, and to compare the frequency to a list of known frequencies.

10. The receiver of claim 1 wherein the predetermined condition is a predetermined number of detected edges.

11. The receiver of claim 1 wherein the predetermined condition is a predetermined accuracy of the carrier frequency.

12. The receiver of claim 1 wherein the switching element comprises means for switching between a modulated signal comprising a carrier and a demodulated signal to produce an incoming signal.

13. The receiver of claim 1 further comprising means for converting the modulated signal into the demodulated signal.

14. The receiver of claim 1 further comprising means for converting a CIR signal into the modulated signal.

15. The receiver of claim 1 further comprising means for determining a duty cycle of the carrier by using the cycle between edge detections.

16. A method of determining a carrier frequency of a signal and decoding the signal comprising:
detecting a first plurality of edges in an incoming signal;
counting a first number of clock cycles between edge detections;
storing the first number in a memory;
determining a carrier frequency based on the first number;
switching to a demodulated signal;
detecting a second plurality of edges in the incoming signal;

counting a second number of clock cycles between edge detections;
storing the second number in memory;
detecting a third plurality of edges in the incoming signal;
counting a third number of clock cycles between edge detections;
adding a total elapsed time spent in a carrier frequency detection mode to the third number; and
storing the third number in memory.

17. The method of claim 16 wherein detecting the first plurality of edges in the incoming signal, counting the first number of clock cycles between edge detections and storing the first number in the memory is repeated until a predetermined criterion is met.

18. The method of claim 16 further comprising determining a duty cycle of a carrier using the first number of clock cycles.

19. A receiver comprising:
a memory coupled to an edge detector and a counter, the edge detector configured to transfer a value from the counter to the memory whenever the edge detector detects an edge in an incoming signal;
a controller configured to cause a switching element to select a modulated signal when the receiver is in a carrier frequency detection mode, the controller further configured to cause the switching element to select a demodulated signal and set a clock to a sampling rate for sampling the demodulated signal when the receiver is in a decoding mode, the controller further configured to add a total elapsed time to a data entry in the memory during a transition between carrier frequency detection mode and decoding mode.

20. The receiver of claim 19 wherein the controller is further configured to set a counter to the total elapsed time when transitioning from carrier frequency detection mode to decoding mode.

* * * * *